US011757119B1

(12) United States Patent
Zaag et al.

(10) Patent No.: US 11,757,119 B1
(45) Date of Patent: Sep. 12, 2023

(54) SYSTEMS AND METHODS FOR HYDROGEN SUPPLY VALVE LEAK DETECTION

(71) Applicant: HYDROGENICS CORPORATION, Mississauga (CA)

(72) Inventors: Nader Zaag, Milton (CA); Sonia Sorbera, Woodbridge (CA); Nathaniel Ian Joos, Mississauga (CA)

(73) Assignee: HYDROGENICS CORPORATIONS, Mississauga (CA)

( * ) Notice: Subject to any disclaimer, the term of this patent is extended or adjusted under 35 U.S.C. 154(b) by 0 days.

(21) Appl. No.: 18/329,996

(22) Filed: Jun. 6, 2023

Related U.S. Application Data (60) Provisional application No. 63/351,087, filed on Jun. 10, 2022.

(51) Int. Cl.
| | |
|---|---|
| *H01M 8/04* | (2016.01) |
| *H01M 8/04992* | (2016.01) |
| *G01M 3/18* | (2006.01) |
| *H01M 8/04111* | (2016.01) |
| *H01M 8/04223* | (2016.01) |
| *H01M 8/04746* | (2016.01) |

(52) U.S. Cl.
CPC ....... *H01M 8/04992* (2013.01); *G01M 3/184* (2013.01); *H01M 8/04111* (2013.01); *H01M 8/04231* (2013.01); *H01M 8/04753* (2013.01); *H01M 8/04761* (2013.01)

(58) Field of Classification Search
CPC ......... H01M 8/04992; H01M 8/04111; H01M 8/04231; H01M 8/04753; H01M 8/04761; G01M 3/184
USPC ........................................................ 429/432
See application file for complete search history.

(56) References Cited

U.S. PATENT DOCUMENTS

| | | | |
|---|---|---|---|
| 2009/0111000 A1* | 4/2009 | Alp | ...................... H01M 8/2457 429/441 |
| 2018/0198141 A1* | 7/2018 | Gagliardo | ......... H01M 8/04388 |
| 2020/0067116 A1* | 2/2020 | Amano | ............. H01M 8/04089 |

* cited by examiner

*Primary Examiner* — James M Erwin
(74) *Attorney, Agent, or Firm* — Barnes & Thornburg LLP (57) ABSTRACT

A method of performing a leak check of a hydrogen supply valve of a fuel cell system includes supplying hydrogen to a fuel cell stack of the system for a predetermined time period closing the supply valve and purge valves, and opening a cathode exhaust valve. The method further includes supplying oxygen to the fuel cell stack for the predetermined time period, continuously measuring a test voltage of the fuel cell stack during the predetermined time period while oxygen is being supplied to the fuel cell stack, and determining that the hydrogen supply valve is leaking in response to the test voltage exceeding a predetermined leak voltage for the predetermined time period.

20 Claims, 4 Drawing Sheets

SYSTEMS AND METHODS FOR HYDROGEN SUPPLY VALVE LEAK DETECTION

CROSS-REFERENCE TO RELATED APPLICATIONS

This non-provisional application claims the benefit and priority, under 35 U.S.C. § 119(e) and any other applicable laws and statutes, to U.S. Provisional Application Ser. No. 63/351,087 filed on Jun. 10, 2022, the entire disclosure of which is incorporated herein by reference.

TECHNICAL FIELD

The present disclosure generally relates to fuel cell stack assemblies, in particular the detection of operating parameters in fuel cell stack assemblies.

BACKGROUND

A fuel cell is one of many repeating units of a fuel cell stack that may provide power or energy for personal, mobility, and/or industrial use. An exemplary fuel cell is comprised of many fuel cell assemblies compressed and bound into a fuel cell stack. A fuel cell is a multi-component assembly that often comprises a membrane electrode assembly (MEA) at the center, a gas diffusion layer (GDL) on either side of the membrane electrode assembly (MEA), and a bipolar plate (BPP) on either side of the gas diffusion layer (GDL). The membrane electrode assembly (MEA) is the component that enables electrochemical reactions in the fuel cell and/or fuel cell stack. In most mobility applications, the reactants supplied to the fuel cell are pure hydrogen for the anode and an oxidant for the cathode.

In many fuel cell systems, a hydrogen supply valve may be included with each fuel cell stack. The supply valve is configured to regulate the supply of hydrogen to the fuel cell stack. Operational complications may arise due to leaks in this hydrogen supply valve, and in some scenarios, the valve may require repair or replacement. Current methods of detecting leaks in the hydrogen supply valve are inefficient and may result in wasted hydrogen as well as excessive maintenance. Thus, it would be advantageous to provide a system for efficiently detecting leaks in the hydrogen supply valve.

SUMMARY

According to the present disclosure, a method of performing a leak check of a hydrogen supply valve of a fuel cell system is disclosed. The method includes measuring an initial voltage of a fuel cell stack of the fuel cell system in order to determine whether the initial voltage is below a predetermined initial threshold voltage indicating the fuel cell stack is sufficiently discharged to execute the hydrogen supply valve leak check and closing the hydrogen supply valve and purge valves of the fuel cell system.

In response to the initial voltage being below the predetermined initial threshold voltage, the method further includes supplying hydrogen to an inlet side of the hydrogen supply valve of the fuel cell stack for a predetermined time period while the hydrogen supply valve remains closed; opening a cathode exhaust valve of the fuel cell system; enabling a blower of the fuel cell system in order to supply an oxidant to the fuel cell stack for the predetermined time period; continuously measuring a test voltage of the fuel cell stack during the predetermined time period while oxygen is being supplied to the fuel cell stack; determining that the hydrogen supply valve is leaking in response to the test voltage exceeding a predetermined leak voltage for the predetermined time period; and one of (i) outputting a message indicative that the hydrogen supply valve is leaking in response to the test voltage exceeding the predetermined leak voltage for the predetermined time period, and (ii) outputting a message indicative that the hydrogen supply valve is not leaking in response to the test voltage not exceeding the predetermined leak voltage for the predetermined time period.

In some embodiments, the predetermined leak voltage may be in a range of about 0.05 VDC to about 10 VDC per each fuel cell of the fuel cell stack. In some embodiments, the predetermined time period may be in a range of about 5 seconds to 60 seconds. In some embodiments, the predetermined initial threshold voltage may be in a range of about 0.05 VDC to about 10 VDC per each fuel cell of the fuel cell stack.

In some embodiments, the method may further comprise arranging the hydrogen supply valve upstream of and fluidically connected to the fuel cell stack; fluidically connecting the hydrogen supply valve to the fuel cell stack; arranging the cathode exhaust valve downstream of the fuel cell stack; fluidically connecting the cathode exhaust valve to the fuel cell stack; arranging the blower upstream of the fuel cell stack; and fluidically connecting the blower to the fuel cell stack. The hydrogen may be supplied to the fuel cell stack via the hydrogen supply valve. In some embodiments, an overall system controller may be communicatively connected to the blower, a hydrogen supply that supplies hydrogen to the fuel cell stack via the hydrogen supply valve, and an air supply that supplies an oxidant to the fuel cell stack via the blower. An engine control unit may be communicatively connected to the fuel cell stack, the hydrogen supply valve, the purge valves, and the cathode exhaust valve. The overall system controller may be communicatively connected to the engine control unit such that at least one of the overall system controller and the engine control unit are configured to carry out the closing of the purge valves, the measuring of the initial voltage, the supplying of hydrogen, the closing of the hydrogen supply valve and the opening of the cathode exhaust valve, the enabling of the blower, the continuous measuring, the determining that the hydrogen supply valve is leaking, and the outputting of the message.

In some embodiments, the method may further comprise carrying out the measuring of the initial voltage of the fuel cell stack after a predetermined shutdown time that has elapsed since the fuel cell system has been shut down.

In some embodiments, the method may further comprise enabling the blower at a minimum PWM that is in a range of about 5% to about 100% for a predetermined blowing time period of about 5 seconds to about 60 seconds.

A fuel cell monitoring system for performing a leak check of a hydrogen supply valve of a fuel cell system according to another aspect of the present disclosure is disclosed. The fuel cell monitoring system includes a fuel cell system and a controller communicatively connected to the fuel cell system. The fuel cell system includes a fuel cell stack having a plurality of fuel cells; a hydrogen supply valve upstream of and fluidically connected to the fuel cell stack and configured to regulate a supply of hydrogen to the fuel cell stack; a cathode exhaust valve arranged downstream of and fluidically connected to the fuel cell stack; a blower arranged upstream of and fluidically connected to the fuel cell stack and configured to regulate a supply of air to the fuel cell stack; and a purge valve arranged downstream of and fluidically connected to the fuel cell stack. The controller is configured to measure an initial voltage of the fuel cell stack in order to determine whether the initial voltage is below a predetermined initial threshold voltage, indicating the fuel cell stack is sufficiently discharged to execute the hydrogen supply valve leak check; and to close the hydrogen supply valve and purge valves of the fuel cell system.

In response to the initial voltage being below the predetermined initial threshold voltage, the controller is configured to supply hydrogen to an inlet side of the hydrogen supply valve of the fuel cell stack for a predetermined time period while the hydrogen supply valve remains closed; open the cathode exhaust valve; enable a blower of the fuel cell system in order to supply an oxidant to the fuel cell stack for the predetermined time period; continuously measure a test voltage of the fuel cell stack during the predetermined time period while oxygen is being supplied to the fuel cell stack; determine that the hydrogen supply valve is leaking in response to the test voltage exceeding a predetermined leak voltage for the predetermined time period; and one of (i) output a message indicative that the hydrogen supply valve is leaking in response to the test voltage exceeding the predetermined leak voltage for the predetermined time period, and (ii) output a message indicative that the hydrogen supply valve is not leaking in response to the test voltage not exceeding the predetermined leak voltage for the predetermined time period.

In some embodiments, the fuel cell system may include a plurality of fuel cell modules, which each include a fuel cell stack, a hydrogen supply valve, a purge valve, and a cathode exhaust valve. In some embodiments, each fuel cell module of the plurality of fuel cell modules may include a unique controller configured to, for the respective fuel cell module, carry out the closing of the purge valves, the measuring of the initial voltage, the supplying of hydrogen, the closing of the hydrogen supply valve and the opening of the cathode exhaust valve, the enabling of the blower, the continuous measuring, the determining that the hydrogen supply valve is leaking, and the outputting of the message. In some embodiments, the predetermined leak voltage may be in a range of about 0.05 VDC to about 10 VDC per each fuel cell of the fuel cell stack. In some embodiments, the predetermined time period may be in a range of about 5 seconds to 60 seconds. In some embodiments, the predetermined initial threshold voltage may be in a range of about 0.05 VDC to about 10 VDC per each fuel cell of the fuel cell stack.

In some embodiments, the controller may be configured to carry out the measuring of the initial voltage of the fuel cell stack after a predetermined shutdown time that has elapsed since the fuel cell system has been shut down.

According to another aspect of the present disclosure, a non-transitory computer-readable storage medium with instructions which, when executed by a computer, carry out a leak check of a hydrogen supply valve of a fuel cell system is disclosed. The non-transitory computer-readable storage medium has instructions which include measuring an initial voltage of a fuel cell stack of the fuel cell system in order to determine whether the initial voltage is below a predetermined initial threshold voltage indicating the fuel cell stack is sufficiently discharged to execute the hydrogen supply valve leak check and closing the hydrogen supply valve and purge valves of the fuel cell system In response to the initial voltage being below the predetermined initial threshold voltage, the non-transitory computer-readable storage medium has instructions which include supplying hydrogen to an inlet side of the hydrogen supply valve of the fuel cell stack for a predetermined time period while the hydrogen supply valve remains closed; opening a cathode exhaust valve of the fuel cell system; enabling a blower of the fuel cell system in order to supply an oxidant to the fuel cell stack for the predetermined time period; continuously measuring a test voltage of the fuel cell stack during the predetermined time period while oxygen is being supplied to the fuel cell stack; determining that the hydrogen supply valve is leaking in response to the test voltage exceeding a predetermined leak voltage for the predetermined time period; and one of (i) outputting a message indicative that the hydrogen supply valve is leaking in response to the test voltage exceeding the predetermined leak voltage for the predetermined time period, and (ii) outputting a message indicative that the hydrogen supply valve is not leaking in response to the test voltage not exceeding the predetermined leak voltage for the predetermined time period.

In some embodiments, the predetermined leak voltage may be in a range of about 0.05 VDC to about 10 VDC per each fuel cell of the fuel cell stack. In some embodiments, the predetermined time period may be in a range of about 5 seconds to 60 seconds. In some embodiments, the predetermined initial threshold voltage may be in a range of about 0.05 VDC to about 10 VDC per each fuel cell of the fuel cell stack.

In some embodiments, the instructions, when executed by a computer, may further carry out the measuring of the initial voltage of the fuel cell stack after a predetermined shutdown time that has elapsed since the fuel cell system has been shut down.

BRIEF DESCRIPTION OF DRAWINGS

This disclosure will be more fully understood from the following detailed description taken in conjunction with the accompanying drawings, in which.

DETAILED DESCRIPTION

The present disclosure is directed to a fuel cell monitoring system 100 for a fuel cell system 110 including at least one fuel cell module 114, the monitoring system 100 configured to detect leakage in a hydrogen supply valve 136 of the fuel cell system 110. In some embodiments, the detection process may be carried out by at least one of an overall system controller (OSC) 122 or an engine control unit (ECU) 124.

Figure 1A:
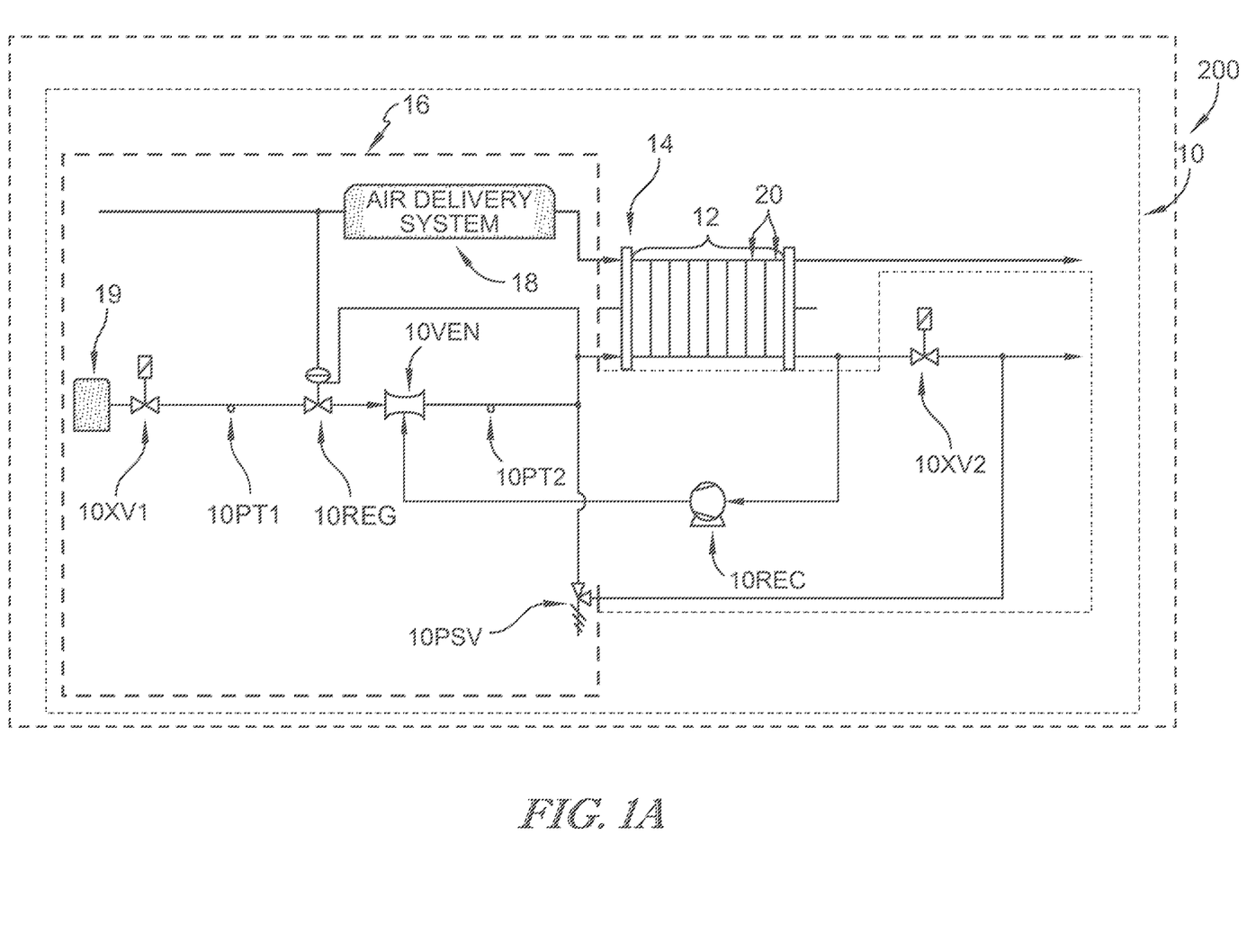
FIG. 1A is a schematic view of an exemplary fuel cell system including an air delivery system, a hydrogen delivery system, and a fuel cell module including a stack of multiple fuel cells.
Figure 1B:
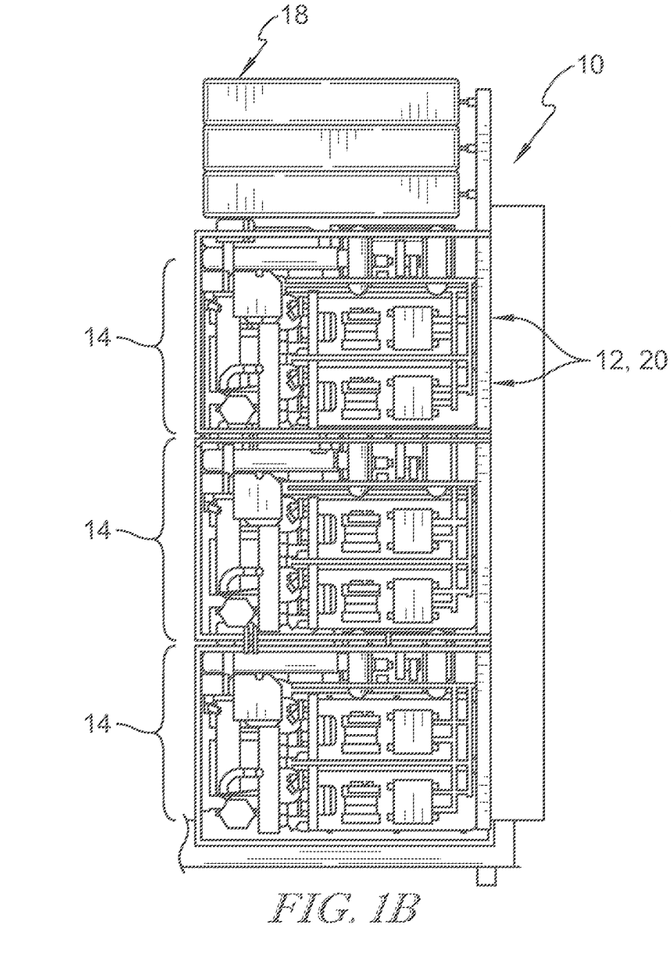
FIG. 1B is a cutaway view of an exemplary fuel cell system including an air delivery system, hydrogen delivery systems, and a plurality of fuel cell modules each including multiple fuel cell stacks.
Figure 1C:
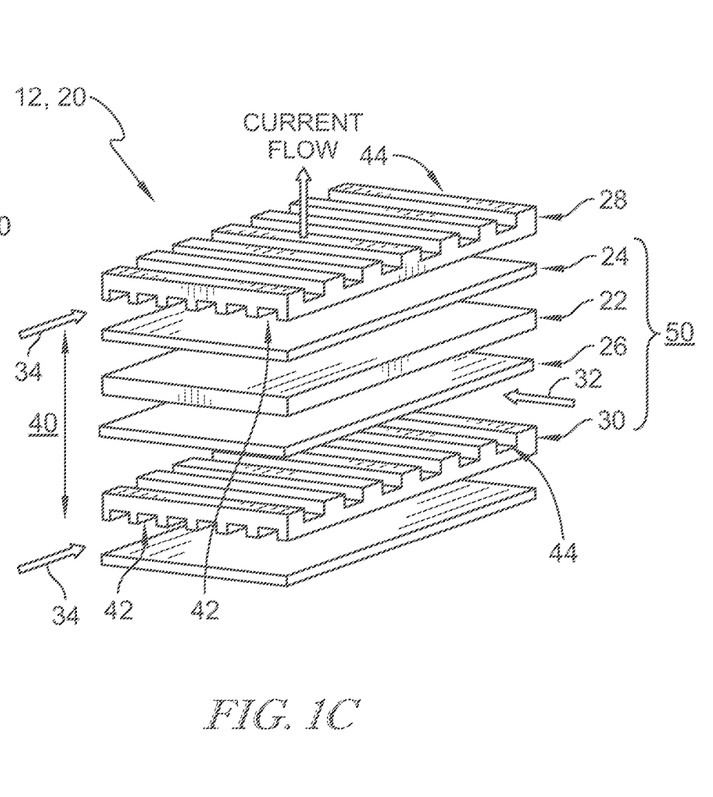
FIG. 1C is a perspective view of an exemplary repeating unit of a fuel cell stack of the fuel cell system of FIG. 1A.

As shown in FIG. 1A, fuel cell systems 10 often include one or more fuel cell stacks 12 ("STK") or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
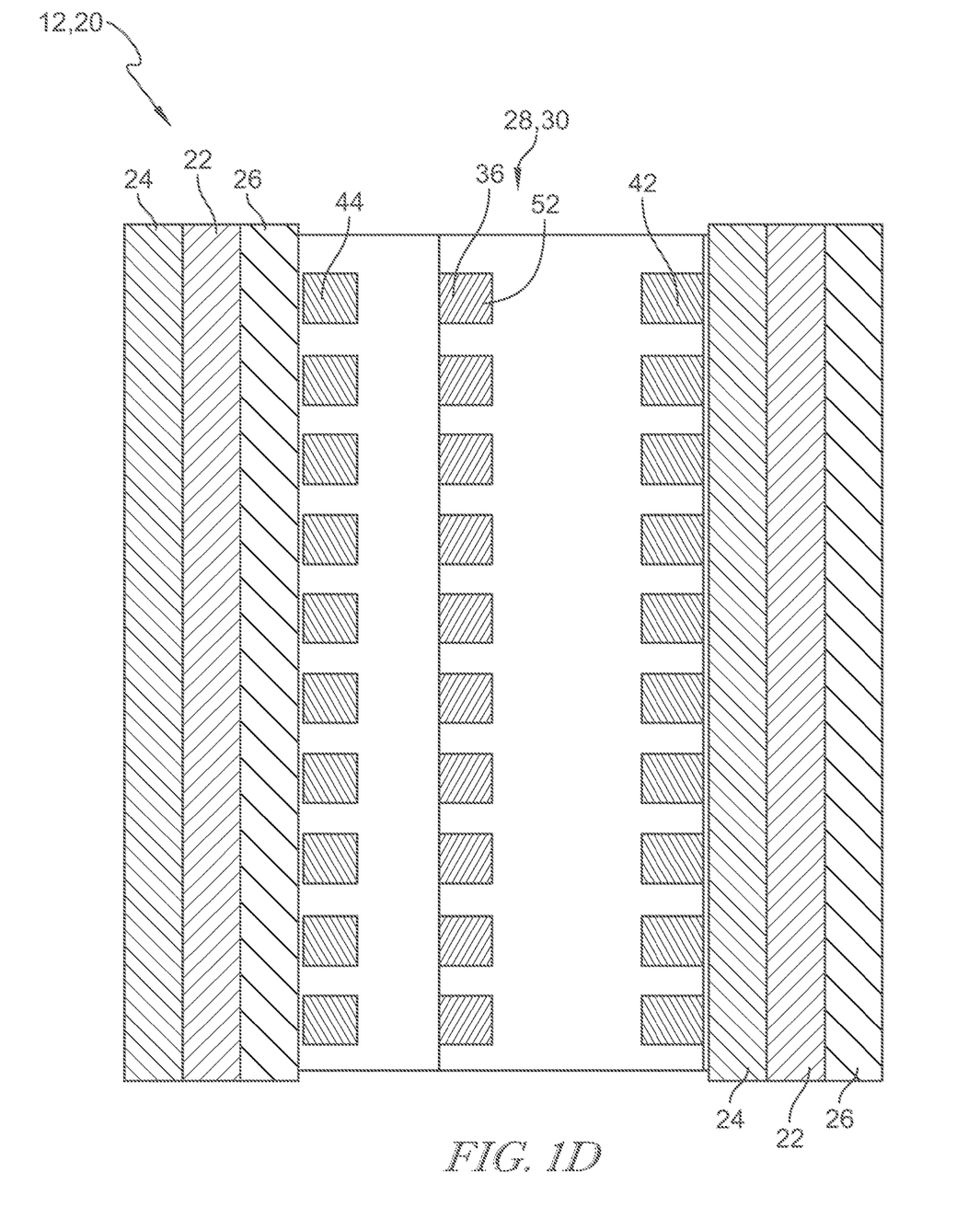
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system, or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

In some embodiments, the fuel cell system 10 may include an on/off valve 10XV1, a pressure transducer 10PT1, a mechanical regulator 10REG, and a venturi 10VEN arranged in operable communication with each other and downstream of the hydrogen delivery system and/or source of hydrogen 19. The pressure transducer 10PT1 may be arranged between the on/off valve 10XV1 and the mechanical regulator 10REG. In some embodiments, a proportional control valve may be utilized instead of a mechanical regulator 10REG. In some embodiments, a second pressure transducer 10PT2 is arranged downstream of the venturi 10VEN, which is downstream of the mechanical regulator 10REG.

In some embodiments, the fuel cell system 10 may further include a recirculation pump 10REC downstream of the stack 12 and operably connected to the venturi 10VEN. The fuel cell system 10 may also include a further on/off valve 10XV2 downstream of the stack 12, and a pressure transfer valve 10PSV.

The present fuel cell system 10 may also be comprised in mobile applications. In an exemplary embodiment, the fuel cell system 10 is in a vehicle and/or a powertrain 200. A vehicle 200 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 200 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 200 may be used on roadways, highways, railways, airways, and/or waterways. The vehicle 200 may be used in applications including but not limited to off highway transit, bobtails, and/or mining equipment. For example, an exemplary embodiment of mining equipment vehicle 200 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figure 2:
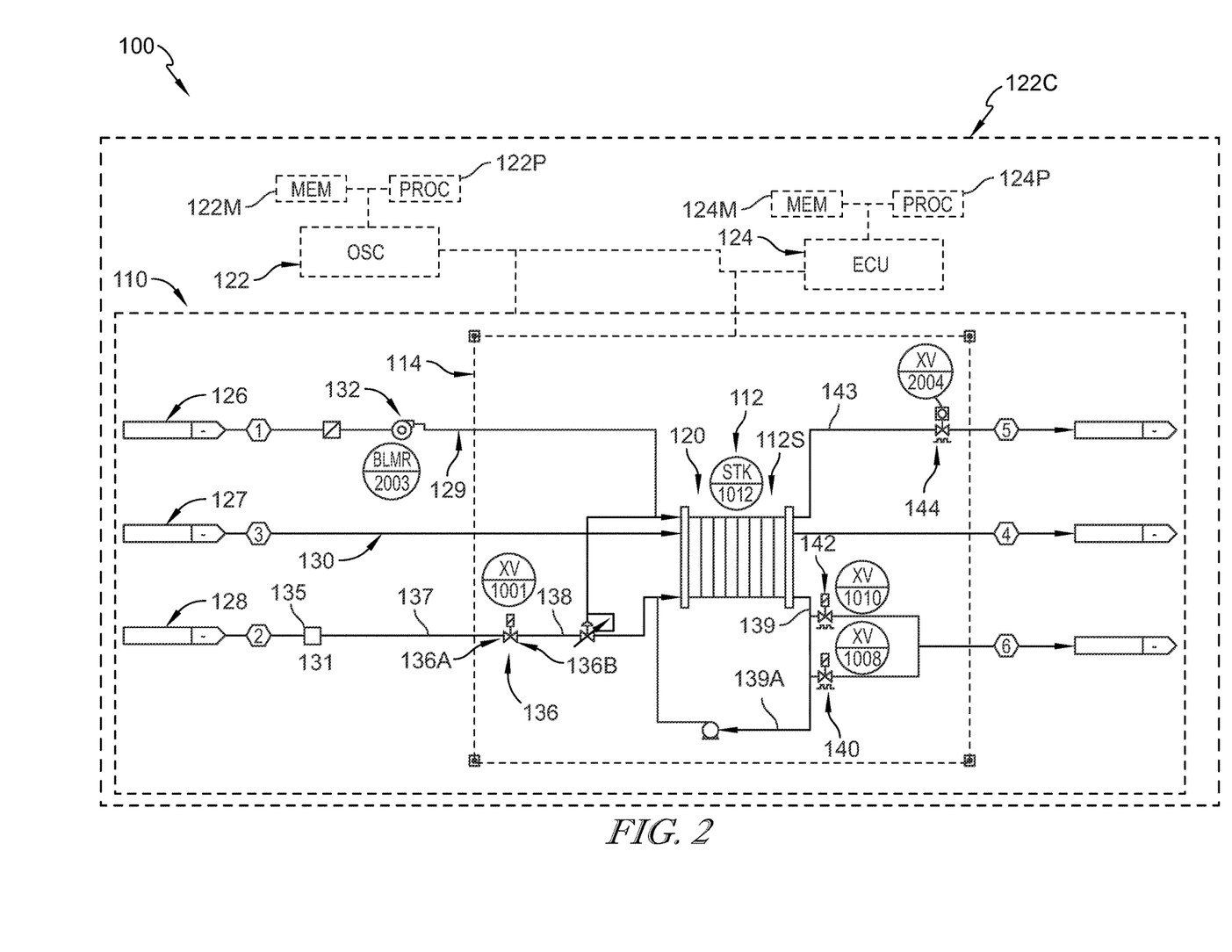
FIG. 2 is a schematic view of a fuel cell monitoring system according to a first aspect of the present disclosure, showing that the system includes an overall system controller (OSC) and an engine control unit (ECU), each configured to control air supplied to the fuel cell stack via an air blower, to control a hydrogen supply valve, and to detect a leak in the hydrogen supply valve.

As shown in FIG. 2, a fuel cell monitoring system 100 is configured to monitor the operation of a fuel cell system 110 so as to detect a leakage in the hydrogen supply valve 136 of a fuel cell module 114 of the fuel cell system 110. The fuel cell system 110 includes at least one fuel cell stack 112 having a plurality of fuel cells 120 arranged in a stack assembly. Similar to the fuel cell stack 12 described above, the fuel cells 120 in the fuel cell stack 112 are stacked together to multiply and increase the voltage output of the fuel cell stack 112. The fuel cell monitoring system 100 described herein may be utilized with the fuel cell system 10 described above. As such, any reference to the fuel cell system 110 in the description of the fuel cell monitoring system 100 may also refer to the fuel cell system 10. Similarly, other related components of the fuel cell system 10, including the fuel cell stack 12, the fuel cell modules 14, and the like may be referred to interchangeably with the fuel cell stack 112, the fuel cell modules 120, and similar components as described herein.

As shown in FIGS. 1A-2, and particularly in greater detail in FIG. 2, the fuel cell system 10, 110 further includes an air supply 126 configured to supply oxygen to the system 10, 110, a coolant supply 127 configured to supply coolant to the system 10, 110, and a hydrogen supply 128 configured to supply hydrogen to the system 10, 110. Specifically, the air supply 126 delivers oxygen to the fuel cell stack 12, 112 via an air supply conduit 129, the coolant supply 127 delivers coolant to the fuel cell stack 12, 112 via a coolant supply conduit 130, and the hydrogen supply 128 delivers hydrogen to the fuel cell stack 12, 112 via a hydrogen supply conduit 131. In some embodiments, the air is an oxidant and can be pumped in from a low-pressure blower from the surrounding air, a compressor, or enriched air (O2/N2 combination).

The hydrogen supply conduit 131 includes a hydrogen supply valve 136 arranged thereon, as shown in FIG. 2. The hydrogen supply valve 136 is configured to regulate the amount of hydrogen entering the fuel cell stack 12, 112. In particular, the hydrogen supply valve 136 may include an inlet side 136A and an outlet side 136B and may be configured to regulate the flow of hydrogen such that an amount of hydrogen flowing through a first portion 137 of the hydrogen supply conduit 136 located upstream of the hydrogen supply valve 136 is greater than an amount of hydrogen flowing through a second portion 138 of the hydrogen supply conduit 136 located downstream of the hydrogen supply valve 136. In other embodiments, the hydrogen supply valve 136 may be completely open or completely closed so as to allow uninterrupted flow of hydrogen or to restrict all flow of hydrogen to the fuel cell stack 12, 112, respectively.

As shown in FIG. 2, the fuel cell system 10, 110 further includes a hydrogen outlet conduit 139 and an air outlet conduit 143 exiting the fuel cell stack 12, 112. The hydrogen outlet conduit 139 includes a first purge valve 140 and a second purge valve 142 arranged thereon. In some embodiments, the system 10, 110 may include only a single purge valve or more than two purge valves. At least a portion of the hydrogen may exit the fuel cell stack 12, 112 and pass through the first and second purge valves 140, 142 to exit the system 10, 110, while another portion of the hydrogen may be recirculated back into the fuel cell stack 12, 112 via the recirculation portion 139A of the outlet conduit 139, as shown in FIG. 2. The first and second purge valves 140, 142 are configured to regulate the amount of hydrogen that ultimately exits the system 10, 110.

The air outlet conduit 143 includes a cathode exhaust valve 144 arranged thereon, as shown in FIG. 2. After the oxygen air has exited the fuel cell stack 12, 112 and passes through the air outlet conduit 143 to the cathode exhaust valve 144, the cathode exhaust valve 144 is configured to regulate the amount of oxidant air that ultimately exits the system 10, 110.

The fuel cell stack 12, 112, the hydrogen supply valve 136, the purge valves 140, 142, and the cathode exhaust valve 144 together define a fuel cell module 14, 114, as indicated schematically by the dashed line in FIG. 2. The fuel cell system 10, 110 may include a single fuel cell module 14, 114, or multiple fuel cell modules 14, 114 connected in series or in parallel. In some embodiments, the system 10, 110 may include six modules 14, 114. In some embodiments, the system 10, 110 may include two or more modules 14, 114. In some embodiments, the system 10, 110 may include three or more modules 14, 114. In some embodiments, the system 10, 110 may include four or more modules 14, 114. In some embodiments, the system 10, 110 may include five or more modules 14, 114. In some embodiments, the system 10, 110 may include six or more modules 14, 114. As will be described bellow, the fuel cell monitoring system 100 may be configured to monitor the hydrogen supply valve 136 of a single fuel cell module 14, 114, or the hydrogen supply valves 136 of each fuel cell module 14, 114 of an embodiment including multiple modules 14, 114.

As shown in FIG. 2, the fuel cell monitoring system 100 includes an overall system controller (OSC) 122 that is operably connected to one, more, or each of the components of the fuel cell system 10, 110. In particular, the overall system controller 122 may be electrically and communicatively connected to and configured to control operation of the fuel cell stack(s) 12, 112 of each fuel cell module 14, 114, as well as each air, coolant, and hydrogen supply 126, 127, 128. In addition, the overall system controller 122 may be electrically and communicatively connected to and configured to control operation of each blower 132, each hydrogen supply valve 136, each purge valve 140, 142, and each cathode exhaust valve 144.

Similarly, each fuel cell module 14, 114 includes an engine control unit (ECU) 124, as shown in FIG. 2. The engine control unit 14, 114 is operably connected to each of the components of the fuel cell module 14, 114. In particular, the engine control unit 124 may be electrically and communicatively connected to and configured to control operation of the fuel cell stack 12, 112 of the fuel cell module 14, 114, as well as the hydrogen supply valve 136, the purge valves 140, 142, and the cathode exhaust valve 144.

Each fuel cell module 14, 114 may include a unique engine control unit 124. Moreover, the overall system controller 122 and the engine control unit 124 are in communication with each other such that the engine control unit 124 may indirectly control, via communication with the overall system controller 122, operation of the air, coolant, and hydrogen supplies 126, 127, 128 and the blower 132 associated with that fuel cell module 14, 114.

In some embodiments, the overall system controller 122 and the engine control unit 124 may include a memory 122M, 124M and a processor 122P, 124P. The memory 122M and the processor 122P are in communication with each other, and the memory 124M and the processor 124P are in communication with each other.

The processor 122P, 124P may be embodied as any type of computational processing tool or equipment capable of performing the functions described herein. For example, the processor 122P, 124P may be embodied as a single or multi-core processor(s), digital signal processor, microcontroller, or other processor or processing/controlling circuit. The memory 122M, 124M may be embodied as any type of volatile or non-volatile memory 122M, 124M or data storage capable of performing the functions described herein. Moreover, the controller 130 may also include additional and/or alternative components, such as those commonly found in a computer (e.g., various input/output devices). In other embodiments, one or more controllers 130 of components may be incorporated in, or otherwise form a portion of, another component. For example, the memory 122M, 124M, or portions thereof, may be incorporated in the processor 122P, 124P. Such combinations of processing, memory storage and utilization, and related functionality may be also referred to a non-transitory computer-readable storage medium with instructions that can be executed by a computer.

In operation, the memory 122M, 124M may store various data and software used during operation of the controller 130 such as operating systems, applications, programs, libraries, and drivers. The memory 122M, 124M is communicatively coupled to the processor 122P, 124P via an I/O subsystem, which may be embodied as circuitry and/or components to facilitate input/output operations with the processor 122P, 124P, the memory 122M, 124M, and other components of the controller 130. In one embodiment, the memory 122M, 124M may be directly coupled to the processor 122P, 124P, for example via an integrated memory controller hub. Additionally, in some embodiments, the I/O subsystem may form a portion of a system-on-a-chip (SoC) and be incorporated, along with the processor 122P, 124P, the memory 122M, 124M, and/or other components of the controller 130, on a single integrated circuit chip (not shown).

A communication network 122C or communication environment 122C may be utilized to communicate between components, such as between the overall system controller 122 and the engine control unit 124, and between the overall system controller 122 and/or the engine control unit 124 and the fuel cell stack(s) 12, 112, the air, coolant, and hydrogen supplies 126, 127, 128, the blowers 132, the hydrogen supply valves 136, the purge valves 140, 142, and the cathode exhaust valves 144. The network 122C may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices.

Illustratively, as shown in FIG. 2, at least one of the overall system controller 122 and the engine control unit 124 of the fuel cell monitoring system 100 is configured to detect a leak in the hydrogen supply valve(s) 136 of the system 10, 110. In particular, the overall system controller 122 may be configured to detect a leak in the hydrogen supply valve 136 of each fuel cell module 14, 114 of the fuel cell system 10, 110. In addition, the engine control unit 124 may be configured to detect a leak in the hydrogen supply valve 136 of the particular fuel cell module 14, 114 associated with that engine control unit 124.

In order to detect a leak in the hydrogen supply valve(s) 136, the appropriate controller executes a leak check. In particular, the overall system controller 122 executes the leak check to check the hydrogen supply valve 136 of each fuel cell module 14, 114 of the fuel cell system 10, 110. Simultaneously, consecutively, in a time period, and/or in real-time, the engine control unit 124 executes the leak check to check the hydrogen supply valve 136 of the particular fuel cell module 14, 114 associated with that engine control unit 124.

During the leak check, the appropriate controller 122, 124 executes a first operation of performing an initial check of the stack voltage of the fuel cell stack 12, 112 in order to determine whether the stack voltage is below a threshold voltage of the entire stack 12, 112 in order to perform the leak check. This may also be referred to as determining (or measuring) whether an initial voltage of the stack 12, 112, is below a predetermined initial threshold voltage. The initial voltage being below the predetermined initial voltage threshold indicates that the stack is sufficiently discharged to execute the hydrogen supply valve leak check.

In this operation, the appropriate controller 122, 124 may utilize at least one sensor of the system 10, 110 configured to measure the voltage of the fuel cells 20, 120 and or the entire stack 12, 112. This operation will determine if any residual hydrogen is left in the stack 12, 112, such that the remaining operations for the check are only performed if no residual hydrogen remains in the stack 12, 112. In some embodiments, the safe threshold voltage ranges from about 0.05 VDC (volts of direct current) to about 10 VDC per fuel cell 20, 120 of the stack 12, 112, including any specific or range of voltage comprised therein (e.g., approximately 0.2 VDC per fuel cell 20, 120 of the stack 12, 112). A person skilled in the art will understand that this safe threshold voltage may vary based on the design, configuration, and operating conditions of the fuel cell system 10, 110.

In some embodiments, the safe threshold voltage may be in a range of about 0.2 VDC to about 10 VDC. In some embodiments, the safe threshold voltage may be in a range of about 0.4 VDC to about 10 VDC. In some embodiments, the safe threshold voltage may be in a range of about 0.6 VDC to about 10 VDC. In some embodiments, the safe threshold voltage may be in a range of about 0.8 VDC to about 10 VDC. In some embodiments, the safe threshold voltage may be in a range of about 1 VDC to about 10 VDC.

In some embodiments, the safe threshold voltage may be in a range of about 0.05 VDC to about 9 VDC. In some embodiments, the safe threshold voltage may be in a range of about 0.05 VDC to about 8 VDC. In some embodiments, the safe threshold voltage may be in a range of about 0.05 VDC to about 7 VDC. In some embodiments, the safe threshold voltage may be in a range of about 0.05 VDC to about 6 VDC. In some embodiments, the safe threshold voltage may be in a range of about 0.05 VDC to about 5 VDC. In some embodiments, the safe threshold voltage may be in a range of about 0.05 VDC to about 4 VDC. In some embodiments, the safe threshold voltage may be in a range of about 0.05 VDC to about 3 VDC. In some embodiments, the safe threshold voltage may be in a range of about 0.05 VDC to about 2 VDC. In some embodiments, the safe threshold voltage may be in a range of about 0.05 VDC to about 1 VDC.

In some embodiments, the appropriate controller 122, 124 may be configured to perform the initial check of the stack voltage at the first start of the day to ensure the hydrogen in the stack 12, 112 is consumed via the stack discharge resistor which consumes hydrogen at shutdown. In particular, the appropriate controller 122, 124 may be configured to perform the initial check of the stack voltage after a predetermined shutdown time that has elapsed since the system 10, 110 has been shut down. In some embodiments, the predetermined shutdown time may be greater than 3 hours. In some embodiments, the predetermined shutdown time may be greater than 4 hours. In some embodiments, the predetermined shutdown time may be greater than 5 hours. In some embodiments, the predetermined shutdown time may be greater than 6 hours. In some embodiments, the predetermined shutdown time may be greater than 7 hours. In some embodiments, the predetermined shutdown time may be greater than 8 hours. In some embodiments, the predetermined shutdown time may be greater than 9 hours. In some embodiments, after it has been determined that the stack voltage is discharged, the system 10, 110 is considered to have entered a "supply valve check" state or status. The appropriate controller 122, 124 may output this status to an operator of the system or other components of the system 10, 110 that may utilize this information for other purposes.

The appropriate controller 122, 124 then executes a second operation of closing all supply valves, including the hydrogen supply valve 136 and may include additional supply valves not shown in FIG. 2, and purge valves 140, 142 of the fuel cell stack 12, 112. In some embodiments, the appropriate controller 122, 124 may subsequently perform a check, via a pressure transmitter 135, as shown in FIG. 2, of whether the pressure of the supply of hydrogen is within a predetermined range, or is above a threshold value, or is below the threshold value. The pressure transmitter 135 may be arranged upstream of the hydrogen supply valve 136 or can be a part of the system integrator scope. The reading of the pressure transmitter 135 may be sent to the appropriate controller 122, 124 via a message protocol, such as CAN-Bus.

The appropriate controller 122, 124 may then execute a third operation of checking whether the hydrogen supply valve 136 and the purge valves 140, 142 are closed, and confirming that the initial voltage is below the predetermined initial threshold voltage. In some embodiments, the appropriate controller 122, 124 only proceeds to the remaining operations described below, in particular operations the fourth through ninth operations, in response to the initial voltage is below the predetermined initial threshold voltage.

The appropriate controller 122, 124 then executes a fourth operation of enabling the main hydrogen supply 128 and thus supplying hydrogen to the inlet side 136A of the hydrogen supply valve 136, in particular while the hydrogen supply valve 136 remains closed, as shown in FIG. 2. Because the hydrogen supply 128 is not part of the fuel cell module 14, 114, in certain scenarios in which the engine control unit 124 is controlling the leak check, the engine control unit 124 communicates with the overall system controller 122 to enable the main hydrogen supply 128. The enablement of the hydrogen supply 128 allows hydrogen to flow to the hydrogen supply valve 136 via the conduit 131.

The appropriate controller 122, 124 then executes a fifth operation of opening the cathode exhaust valve 144 to allow air to flow through the cathode side of the stack 12, 112. The appropriate controller 122, 124 then executes a sixth operation of enabling the blower 132, which may be referred to as a cathode blower, at a minimum PWM (pulse width modulation) in order to deliver an oxidant from the air flow on the cathode side of the stack 12, 112. A person skilled in the art will understand that other components known in the art other than those referred to as "blowers" may be utilized to perform the same or similar functionality as the blower 132.

In some embodiments, the oxygen airflow is kept at 5% to 100% PWM for a predetermined blowing time period, which may be in a range of approximately 5 seconds to 60 seconds in some embodiments. In some embodiments, the oxygen airflow is kept at approximately 10% PWM for approximately 5 seconds. A person skilled in the art will understand that this predetermined time period may vary based on the design, configuration, and operating conditions of the fuel cell system 10, 110.

The appropriate controller 122, 124 then executes a seventh operation of determining whether a leak is present in the hydrogen supply valve(s) 136, which may include continuously measuring a test voltage of the fuel cell stack 12, 112 during the predetermined time period while oxygen is being supplied to the fuel cell stack 12, 112. In this operation, the appropriate controller 122, 124 may utilize at least one sensor 112S of the system 10, 110 configured to measure the voltage of the fuel cells 20, 120 and or the entire stack 12, 112. A leak is present if hydrogen continues to flow into the anode side/anode gas diffusion layer 26 side of the stack 12, 112 while the oxygen air is flowing on the cathode side/cathode gas diffusion layer 24 side of the stack 12, 112. If hydrogen is present, the stack 12, 112 will have a stack voltage indicative of a leak. In this operation, the appropriate controller 122, 124 is configured to measure the stack voltage of the stack 12, 112 while the oxidant is flowing on the cathode side of the stack 12, 112.

The appropriate controller 122, 124 then determines that the hydrogen supply valve(s) 136 is/are leaking in response to the test voltage exceeding a predetermined leak voltage for the predetermined time period. In some embodiments, the predetermined leak voltage is about 0.05 VDC to about 10 VDC per fuel cell of the stack 12, 112, including any specific or range of voltage comprised therein (e.g., approximately 0.2 VDC per fuel cell 20, 120 of the stack 12, 112).

In some embodiments, the predetermined time period during which 0.2 VDC per fuel cell 20, 120 must be exceeded is approximately 5 seconds to 60 seconds, including any specific or range of time comprised therein. In some embodiments, the predetermined leak voltage may be in a range of about 0.2 VDC to about 10 VDC. In some embodiments, the predetermined leak voltage may be in a range of about 0.4 VDC to about 10 VDC. In some embodiments, the predetermined leak voltage may be in a range of about 0.6 VDC to about 10 VDC. In some embodiments, the predetermined leak voltage may be in a range of about 0.8 VDC to about 10 VDC. In some embodiments, the predetermined leak voltage may be in a range of about 1 VDC to about 10 VDC.

In some embodiments, the predetermined leak voltage may be in a range of about 0.05 VDC to about 9 VDC. In some embodiments, the predetermined leak voltage may be in a range of about 0.05 VDC to about 8 VDC. In some embodiments, the predetermined leak voltage may be in a range of about 0.05 VDC to about 7 VDC. In some embodiments, the predetermined leak voltage may be in a range of about 0.05 VDC to about 6 VDC. In some embodiments, the predetermined leak voltage may be in a range of about 0.05 VDC to about 5 VDC. In some embodiments, the predetermined leak voltage may be in a range of about 0.05 VDC to about 4 VDC. In some embodiments, the predetermined leak voltage may be in a range of about 0.05 VDC to about 3 VDC. In some embodiments, the predetermined leak voltage may be in a range of about 0.05 VDC to about 2 VDC. In some embodiments, the predetermined leak voltage may be in a range of about 0.05 VDC to about 1 VDC.

In some embodiments, the predetermined time period is approximately 10 seconds to about 60 seconds. In some embodiments, the predetermined time period is approximately 20 seconds to about 60 seconds. In some embodiments, the predetermined time period is approximately 30 seconds to about 60 seconds. In some embodiments, the predetermined time period is approximately 40 seconds to about 60 seconds. In some embodiments, the predetermined time period is approximately 50 seconds to about 60 seconds.

In some embodiments, the predetermined time period is approximately 5 seconds to about 50 seconds. In some embodiments, the predetermined time period is approximately 5 seconds to about 40 seconds. In some embodiments, the predetermined time period is approximately 5 seconds to about 30 seconds. In some embodiments, the predetermined time period is approximately 5 seconds to about 20 seconds. In some embodiments, the predetermined time period is approximately 5 seconds to about 10 seconds.

In other embodiments, the predetermined leak voltage is approximately 0.3 VDC per fuel cell 20, 120 of the stack 12, 112. In some embodiments, the predetermined time period during which 0.3 VDC per fuel cell 20, 120 must be exceeded is approximately 5 seconds to 60 seconds, including any specific or range of time comprised therein. In some embodiments, the predetermined leak voltage is approximately 60 VDC for the entire stack 12, 112. In some embodiments, the predetermined time period during which 60 VDC for the entire stack 12, 112 must be exceeded is approximately 60 seconds (e.g., 1 VDC per second). A person skilled in the art will understand that this leak voltage may vary based on the design, configuration, and operating conditions of the fuel cell system 10, 110.

In some embodiments, the predetermined voltage leak voltage is based on a percentage of an open circuit voltage. In such embodiments, if the stack voltage is greater than a minimum percentage of an open circuit voltage, the appropriate controller 122, 124 determines that the hydrogen supply valve(s) 136 is/are leaking. The minimum percentage of an open circuit voltage may be approximately 30% of the open circuit voltage.

After the oxygen air flow is delivered on the cathode side/cathode gas diffusion layer 24 side of the stack 12, 112 at the desired PWM level for the predetermined time period and the appropriate controller 122, 124 has made the determination of whether a leak in the hydrogen supply valve(s) 136 exists or not, the appropriate controller 122, 124 executes an eighth operation of shutting off the blower 132 such that no further oxygen air is delivered to the stack 12, 112, and the cathode exhaust valve 144 is closed.

In some embodiments, the appropriate controller 122, 124 then executes a ninth operation of sending or outputting a message to an operator (e.g., a human user or operator) or another internal or external controller/computing device. If a leak is present, the message is indicative of the leak in the hydrogen supply valve(s) 136. If the valve is not leaking, the appropriate controller 122, 124 updates the state or status of the system 10, 110 to "supply valve check complete." The appropriate controller 122, 124 may then send the message indicative that the leak check was completed, and the system 10, 110 safe to operate.

The following described aspects of the present disclosure are contemplated and non- limiting:

A first aspect of the present disclosure relates to a method of performing a leak check of a hydrogen supply valve of a fuel cell system. The method includes measuring an initial voltage of a fuel cell stack of the fuel cell system in order to determine whether the initial voltage is below a predetermined initial threshold voltage indicating the fuel cell stack is sufficiently discharged to execute the hydrogen supply valve leak check and closing the hydrogen supply valve and purge valves of the fuel cell system.

In response to the initial voltage being below the predetermined initial threshold voltage, the method further includes supplying hydrogen to an inlet side of the hydrogen supply valve of the fuel cell stack for a predetermined time period while the hydrogen supply valve remains closed; opening a cathode exhaust valve of the fuel cell system; enabling a blower of the fuel cell system in order to supply an oxidant to the fuel cell stack for the predetermined time period; continuously measuring a test voltage of the fuel cell stack during the predetermined time period while oxygen is being supplied to the fuel cell stack; determining that the hydrogen supply valve is leaking in response to the test voltage exceeding a predetermined leak voltage for the predetermined time period; and one of (i) outputting a message indicative that the hydrogen supply valve is leaking in response to the test voltage exceeding the predetermined leak voltage for the predetermined time period, and (ii) outputting a message indicative that the hydrogen supply valve is not leaking in response to the test voltage not exceeding the predetermined leak voltage for the predetermined time period.

A second aspect of the present disclosure relates to a fuel cell monitoring system for performing a leak check of a hydrogen supply valve of a fuel cell system. The fuel cell monitoring system includes a fuel cell system and a controller communicatively connected to the fuel cell system. The fuel cell system includes a fuel cell stack having a plurality of fuel cells; a hydrogen supply valve upstream of and fluidically connected to the fuel cell stack and configured to regulate a supply of hydrogen to the fuel cell stack; a cathode exhaust valve arranged downstream of and fluidically connected to the fuel cell stack; a blower arranged upstream of and fluidically connected to the fuel cell stack and configured to regulate a supply of air to the fuel cell stack; and a purge valve arranged downstream of and fluidically connected to the fuel cell stack. The controller is configured to: 1) measure an initial voltage of the fuel cell stack in order to 2) determine whether the initial voltage is below a predetermined initial threshold voltage, which indicates the fuel cell stack is sufficiently discharged to execute the hydrogen supply valve leak check; and 3) close the hydrogen supply valve and purge valves of the fuel cell system.

In response to the initial voltage being below the predetermined initial threshold voltage, the controller is configured to supply hydrogen to an inlet side of the hydrogen supply valve of the fuel cell stack for a predetermined time period while the hydrogen supply valve remains closed; open the cathode exhaust valve; enable a blower of the fuel cell system in order to supply an oxidant to the fuel cell stack for the predetermined time period; continuously measure a test voltage of the fuel cell stack during the predetermined time period while oxygen is being supplied to the fuel cell stack; determine that the hydrogen supply valve is leaking in response to the test voltage exceeding a predetermined leak voltage for the predetermined time period; and one of (i) output a message indicative that the hydrogen supply valve is leaking in response to the test voltage exceeding the predetermined leak voltage for the predetermined time period, and (ii) output a message indicative that the hydrogen supply valve is not leaking in response to the test voltage not exceeding the predetermined leak voltage for the predetermined time period.

A third aspect of the present disclosure relates to a non-transitory computer-readable storage medium with instructions which, when executed by a computer, carry out a leak check of a hydrogen supply valve of a fuel cell system. The non-transitory computer-readable storage medium has instructions which include measuring an initial voltage of a fuel cell stack of the fuel cell system in order to determine whether the initial voltage is below a predetermined initial threshold voltage indicating the fuel cell stack is sufficiently discharged to execute the hydrogen supply valve leak check and closing the hydrogen supply valve and purge valves of the fuel cell system In the first aspect of the present disclosure, the predetermined leak voltage may be in a range of about 0.05 VDC to about 10 VDC per each fuel cell of the fuel cell stack. In the first aspect of the present disclosure, the predetermined time period may be in a range of about 5 seconds to 60 seconds. In the first aspect of the present disclosure, the predetermined initial threshold voltage may be in a range of about 0.05 VDC to about 10 VDC per each fuel cell of the fuel cell stack.

In response to the initial voltage being below the predetermined initial threshold voltage, the non-transitory computer-readable storage medium has instructions which include supplying hydrogen to an inlet side of the hydrogen supply valve of the fuel cell stack for a predetermined time period while the hydrogen supply valve remains closed; opening a cathode exhaust valve of the fuel cell system; enabling a blower of the fuel cell system in order to supply an oxidant to the fuel cell stack for the predetermined time period; continuously measuring a test voltage of the fuel cell stack during the predetermined time period while oxygen is being supplied to the fuel cell stack; determining that the hydrogen supply valve is leaking in response to the test voltage exceeding a predetermined leak voltage for the predetermined time period; and one of (i) outputting a message indicative that the hydrogen supply valve is leaking in response to the test voltage exceeding the predetermined leak voltage for the predetermined time period, and (ii) outputting a message indicative that the hydrogen supply valve is not leaking in response to the test voltage not exceeding the predetermined leak voltage for the predetermined time period.

In the first aspect of the present disclosure, the method may further comprise arranging the hydrogen supply valve upstream of and fluidically connected to the fuel cell stack; fluidically connecting the hydrogen supply valve to the fuel cell stack; arranging the cathode exhaust valve downstream of the fuel cell stack; fluidically connecting the cathode exhaust valve to the fuel cell stack; arranging the blower upstream of the fuel cell stack; and fluidically connecting the blower to the fuel cell stack. The hydrogen may be supplied to the fuel cell stack via the hydrogen supply valve. In the first aspect of the present disclosure, an overall system controller may be communicatively connected to the blower, a hydrogen supply that supplies hydrogen to the fuel cell stack via the hydrogen supply valve, and an air supply that supplies an oxidant to the fuel cell stack via the blower. An engine control unit may be communicatively connected to the fuel cell stack, the hydrogen supply valve, the purge valves, and the cathode exhaust valve. The overall system controller may be communicatively connected to the engine control unit such that at least one of the overall system controller and the engine control unit are configured to carry out the closing of the purge valves, the measuring of the initial voltage, the supplying of hydrogen, the closing of the hydrogen supply valve and the opening of the cathode exhaust valve, the enabling of the blower, the continuous measuring, the determining that the hydrogen supply valve is leaking, and the outputting of the message.

In the first aspect of the present disclosure, the method may further comprise carrying out the measuring of the initial voltage of the fuel cell stack after a predetermined shutdown time that has elapsed since the fuel cell system has been shut down.

In the first aspect of the present disclosure, the method may further comprise enabling the blower at a minimum PWM that is in a range of about 5% to about 100% for a predetermined blowing time period of about 5 seconds to about 60 seconds.

In the second aspect of the present disclosure, the fuel cell system may include a plurality of fuel cell modules, which each include a fuel cell stack, a hydrogen supply valve, a purge valve, and a cathode exhaust valve. In the second aspect of the present disclosure, each fuel cell module of the plurality of fuel cell modules may include a unique controller configured to, for the respective fuel cell module, carry out the closing of the purge valves, the measuring of the initial voltage, the supplying of hydrogen, the closing of the hydrogen supply valve and the opening of the cathode exhaust valve, the enabling of the blower, the continuous measuring, the determining that the hydrogen supply valve is leaking, and the outputting of the message. In the second aspect of the present disclosure, the predetermined leak voltage may be in a range of about 0.05 VDC to about 10 VDC per each fuel cell of the fuel cell stack. In the second aspect of the present disclosure, the predetermined time period may be in a range of about 5 seconds to 60 seconds. In the second aspect of the present disclosure, the predetermined initial threshold voltage may be in a range of about 0.05 VDC to about 10 VDC per each fuel cell of the fuel cell stack.

In the second aspect of the present disclosure, the controller may be configured to carry out the measuring of the initial voltage of the fuel cell stack after a predetermined shutdown time that has elapsed since the fuel cell system has been shut down.

In the third aspect of the present disclosure, the predetermined leak voltage may be in a range of about 0.05 VDC to about 10 VDC per each fuel cell of the fuel cell stack. In the third aspect of the present disclosure, the predetermined time period may be in a range of about 5 seconds to 60 seconds. In the third aspect of the present disclosure, the predetermined initial threshold voltage may be in a range of about 0.05 VDC to about 10 VDC per each fuel cell of the fuel cell stack.

In the third aspect of the present disclosure, the instructions, when executed by a computer, may further carry out the measuring of the initial voltage of the fuel cell stack after a predetermined shutdown time that has elapsed since the fuel cell system has been shut down.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There is a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising", "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising"also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about" or "substantially", is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise. In some embodiments, such approximating language may refer to any value within three percent of the indicated value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method of performing a leak check of a hydrogen supply valve of a fuel cell system, comprising:
    measuring an initial voltage of a fuel cell stack of the fuel cell system in order to determine whether the initial voltage is below a predetermined initial threshold voltage, indicating the fuel cell stack is sufficiently discharged to execute the hydrogen supply valve leak check;
    closing the hydrogen supply valve and purge valves of the fuel cell system; and
    in response to the initial voltage being below the predetermined initial threshold voltage:
        supplying hydrogen to an inlet side of the hydrogen supply valve of the fuel cell stack for a predetermined time period while the hydrogen supply valve remains closed;
        opening a cathode exhaust valve of the fuel cell system;
        enabling a blower of the fuel cell system in order to supply an oxidant to the fuel cell stack for the predetermined time period;
        continuously measuring a test voltage of the fuel cell stack during the predetermined time period while oxygen is being supplied to the fuel cell stack;
        determining that the hydrogen supply valve is leaking in response to the test voltage exceeding a predetermined leak voltage for the predetermined time period; and
        one of (i) outputting a message indicative that the hydrogen supply valve is leaking in response to the test voltage exceeding the predetermined leak voltage for the predetermined time period or (ii) outputting a message indicative that the hydrogen supply valve is not leaking in response to the test voltage not exceeding the predetermined leak voltage for the predetermined time period.

2. The method of claim 1, wherein the predetermined leak voltage is in a range of about 0.05 VDC to about 10 VDC per each fuel cell of the fuel cell stack.

3. The method of claim 2, wherein the predetermined time period is in a range of about 5 seconds to 60 seconds.

4. The method of claim 3, wherein the predetermined initial threshold voltage is in a range of about 0.05 VDC to about 10 VDC per each fuel cell of the fuel cell stack.

5. The method of claim 1, further comprising:
    arranging the hydrogen supply valve upstream of and fluidically connected to the fuel cell stack;
    fluidically connecting the hydrogen supply valve to the fuel cell stack;
    arranging the cathode exhaust valve downstream of the fuel cell stack;
    fluidically connecting the cathode exhaust valve to the fuel cell stack;
    arranging the blower upstream of the fuel cell stack; and
    fluidically connecting the blower to the fuel cell stack, wherein the hydrogen is supplied to the fuel cell stack via the hydrogen supply valve.

6. The method of claim 5, wherein an overall system controller is communicatively connected to the blower, a hydrogen supply that supplies hydrogen to the fuel cell stack via the hydrogen supply valve, and an air supply that supplies an oxidant to the fuel cell stack via the blower, wherein an engine control unit is communicatively connected to the fuel cell stack, the hydrogen supply valve, the purge valves, and the cathode exhaust valve, and wherein the overall system controller is communicatively connected to the engine control unit such that at least one of the overall system controller and the engine control unit are configured to carry out the closing of the purge valves, the measuring of the initial voltage, the supplying of hydrogen, the closing of the hydrogen supply valve and the opening of the cathode exhaust valve, the enabling of the blower, the continuous measuring, the determining that the hydrogen supply valve is leaking, and the outputting of the message.

7. The method of claim 1, further comprising:
    carrying out the measuring of the initial voltage of the fuel cell stack after a predetermined shutdown time that has elapsed since the fuel cell system has been shut down.

8. The method of claim 1, further comprising:
    enabling the blower at a minimum PWM that is in a range of about 5% to about 100% for a predetermined blowing time period of about 5 seconds to about 60 seconds.

9. A fuel cell monitoring system for performing a leak check of a hydrogen supply valve of a fuel cell system, comprising:
    a fuel cell system, including:
    a fuel cell stack having a plurality of fuel cells;
    a hydrogen supply valve upstream of and fluidically connected to the fuel cell stack and configured to regulate a supply of hydrogen to the fuel cell stack;
    a cathode exhaust valve arranged downstream of and fluidically connected to the fuel cell stack;
    a blower arranged upstream of and fluidically connected to the fuel cell stack and configured to regulate a supply of air to the fuel cell stack; and
    a purge valve arranged downstream of and fluidically connected to the fuel cell stack; and
    a controller communicatively connected to the fuel cell system and configured to:
        measure an initial voltage of the fuel cell stack in order to determine whether the initial voltage is below a predetermined initial threshold voltage indicating the fuel cell stack is sufficiently discharged to execute the hydrogen supply valve leak check;
        close the hydrogen supply valve and purge valves of the fuel cell system; and in response to the initial voltage being below the predetermined initial threshold voltage:
            supply hydrogen to an inlet side of the hydrogen supply valve of the fuel cell stack for a predetermined time period while the hydrogen supply valve remains closed;

open the cathode exhaust valve;
enable a blower of the fuel cell system in order to supply an oxidant to the fuel cell stack for the predetermined time period;
continuously measure a test voltage of the fuel cell stack during the predetermined time period while oxygen is being supplied to the fuel cell stack;
determine that the hydrogen supply valve is leaking in response to the test voltage exceeding a predetermined leak voltage for the predetermined time period; and
one of (i) output a message indicative that the hydrogen supply valve is leaking in response to the test voltage exceeding the predetermined leak voltage for the predetermined time period or (ii) output a message indicative that the hydrogen supply valve is not leaking in response to the test voltage not exceeding the predetermined leak voltage for the predetermined time period.

10. The fuel cell monitoring system of claim 9, wherein the fuel cell system includes a plurality of fuel cell modules which each include a fuel cell stack, a hydrogen supply valve, a purge valve, and a cathode exhaust valve.

11. The fuel cell monitoring system of claim 10, wherein each fuel cell module of the plurality of fuel cell modules includes a unique controller configured to, for the respective fuel cell module, carry out the closing of the purge valves, the measuring of the initial voltage, the supplying of hydrogen, the closing of the hydrogen supply valve and the opening of the cathode exhaust valve, the enabling of the blower, the continuous measuring, the determining that the hydrogen supply valve is leaking, and the outputting of the message.

12. The fuel cell monitoring system of claim 11, wherein the predetermined leak voltage is in a range of about 0.05 VDC to about 10 VDC per each fuel cell of the fuel cell stack.

13. The fuel cell monitoring system of claim 12, wherein the predetermined time period is in a range of about 5 seconds to 60 seconds.

14. The fuel cell monitoring system of claim 13, wherein the predetermined initial threshold voltage is in a range of about 0.05 VDC to about 10 VDC per each fuel cell of the fuel cell stack.

15. The fuel cell monitoring system of claim 9, wherein the controller is configured to carry out the measuring of the initial voltage of the fuel cell stack after a predetermined shutdown time that has elapsed since the fuel cell system has been shut down.

16. A non-transitory computer-readable storage medium with instructions which, when executed by a computer, carry out a leak check of a hydrogen supply valve of a fuel cell system, including:

measuring an initial voltage of a fuel cell stack of the fuel cell system in order to determine whether the initial voltage is below a predetermined initial threshold voltage indicating the fuel cell stack is sufficiently discharged to execute the hydrogen supply valve leak check;
closing the hydrogen supply valve and purge valves of the fuel cell system; and
in response to the initial voltage being below the predetermined initial threshold voltage:
supplying hydrogen to an inlet side of the hydrogen supply valve of the fuel cell stack for a predetermined time period while the hydrogen supply valve remains closed;
opening a cathode exhaust valve of the fuel cell system;
enabling a blower of the fuel cell system in order to supply an oxidant to the fuel cell stack for the predetermined time period;
continuously measuring a test voltage of the fuel cell stack during the predetermined time period while oxygen is being supplied to the fuel cell stack;
determining that the hydrogen supply valve is leaking in response to the test voltage exceeding a predetermined leak voltage for the predetermined time period; and
one of (i) outputting a message indicative that the hydrogen supply valve is leaking in response to the test voltage exceeding the predetermined leak voltage for the predetermined time period or (ii) outputting a message indicative that the hydrogen supply valve is not leaking in response to the test voltage not exceeding the predetermined leak voltage for the predetermined time period.

17. The non-transitory computer-readable storage medium of claim 16, wherein the predetermined leak voltage is in a range of about 0.05 VDC to about 10 VDC per each fuel cell of the fuel cell stack.

18. The non-transitory computer-readable storage medium of claim 17, wherein the predetermined time period is in a range of about 5 seconds to 60 seconds.

19. The non-transitory computer-readable storage medium of claim 18, wherein the predetermined initial threshold voltage is in a range of about 0.05 VDC to about 10 VDC per each fuel cell of the fuel cell stack.

20. The non-transitory computer-readable storage medium of claim 16, wherein the instructions, when executed by a computer, further carry out the measuring of the initial voltage of the fuel cell stack after a predetermined shutdown time that has elapsed since the fuel cell system has been shut down.

* * * * *